US012666310B2

(12) United States Patent　　　(10) Patent No.:　US 12,666,310 B2

Gundavelli et al.　　　　　　　　　(45) Date of Patent:　　Jun. 23, 2026

(54) SERVICE CHAIN INTEGRATION WITH A WIRELESS LOCAL AREA NETWORK (WLAN)

(71) Applicant: Cisco Technology, Inc., San Jose, CA (US)

(72) Inventors: Srinath Gundavelli, San Jose, CA (US); Abhishek Dhammawat, San Jose, CA (US); Shree Narasimha Murthy, San Jose, CA (US); Arun G. Khanna, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 479 days.

(21) Appl. No.: 18/300,637

(22) Filed: Apr. 14, 2023

(65) Prior Publication Data

US 2024/0349119 A1　　Oct. 17, 2024

(51) Int. Cl.
　　*H04W 28/08*　　　(2023.01)
　　*H04L 47/24*　　　(2022.01)
　　*H04W 84/12*　　　(2009.01)

(52) U.S. Cl.
　　CPC ......... *H04W 28/0992* (2020.05); *H04L 47/24* (2013.01); *H04W 84/12* (2013.01)

(58) Field of Classification Search
　　CPC .... H04L 47/24; H04W 28/0992; H04W 84/12
　　USPC ........................................................ 370/329
　　See application file for complete search history.

(56) References Cited

U.S. PATENT DOCUMENTS

| | | | |
|---|---|---|---|
| 9,853,898 B1 | | 12/2017 | Subramanian et al. |
| 11,366,865 B1 | * | 6/2022 | Kuo ...................... H04L 67/303 |
| 11,558,415 B1 | * | 1/2023 | McDonald ............ G06N 20/00 |
| 12,093,389 B2 | * | 9/2024 | Ermey .................. G06F 21/566 |
| 2015/0326589 A1 | * | 11/2015 | Smith ..................... H04L 63/02 |
| | | | 726/1 |
| 2017/0134401 A1 | * | 5/2017 | Medvedovsky .... H04L 63/1458 |
| 2017/0317720 A1 | * | 11/2017 | Turner ................... H04W 8/20 |
| 2018/0359337 A1 | * | 12/2018 | Kodaypak ........... H04L 12/1886 |
| 2019/0168696 A1 | * | 6/2019 | Lau ......................... H04L 67/12 |
| 2020/0036629 A1 | | 1/2020 | Roeland et al. |
| 2020/0358696 A1 | | 11/2020 | Hu et al. |
| 2021/0126847 A1 | * | 4/2021 | Thiel ........................ G06F 9/54 |
| 2021/0314423 A1 | * | 10/2021 | Rolando ............. H04L 41/5054 |
| 2022/0150160 A1 | * | 5/2022 | Kumar ................... H04L 45/42 |
| 2022/0191667 A1 | | 6/2022 | Starsinic et al. |
| 2022/0210179 A1 | * | 6/2022 | Shaw .................. H04L 63/1433 |
| 2022/0210197 A1 | * | 6/2022 | Vaner ..................... H04L 63/20 |
| 2022/0210656 A1 | * | 6/2022 | Shaw .................... H04W 12/08 |

(Continued)

OTHER PUBLICATIONS

Huawei, S300, S500, S2700, S3700, S5700, S6700, S7700, and S9700 Series Switches Typical Configuration Examples; https://support.huawei.com/; Nov. 17, 2022 (11 pages) (retrieved Feb. 8, 2023).

*Primary Examiner* — Robert J Lopata

(74) *Attorney, Agent, or Firm* — Merchant & Gould P.C.

(57) ABSTRACT

Service chain integration with a Wireless Local Area Network (WLAN) may be provided. A computing device may send metadata from a wireless network to a Service Function (SF) selected from one of a plurality of SFs. Then the computing device may receive a control trigger from the SF in response to the metadata. The computing device may then perform a service action on the wireless network in response to the control trigger.

20 Claims, 3 Drawing Sheets

(56) References Cited

U.S. PATENT DOCUMENTS

| | | | |
|---|---|---|---|
| 2022/0360515 A1* | 11/2022 | Vaina | H04L 67/535 |
| 2023/0143232 A1* | 5/2023 | Balazs | H04L 63/1425 |
| | | | 709/223 |
| 2023/0259643 A1* | 8/2023 | Szigeti | G06F 21/6218 |
| | | | 726/28 |
| 2024/0314152 A1* | 9/2024 | Mistry | H04L 63/1408 |

* cited by examiner

200

205
START

210
SEND METADATA FROM A WIRELESS NETWORK TO A SERVICE FUNCTION (SF) SELECTED FROM ONE OF A PLURALITY OF SFs

220
RECEIVE A CONTROL TRIGGER FROM THE SF IN RESPONSE TO THE METADATA

230
PERFORM A SERVICE ACTION ON THE WIRELESS NETWORK IN RESPONSE TO THE CONTROL TRIGGER

240
END

SERVICE CHAIN INTEGRATION WITH A WIRELESS LOCAL AREA NETWORK (WLAN)

TECHNICAL FIELD

The present disclosure relates generally to providing service chain integration with a Wireless Local Area Network (WLAN).

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
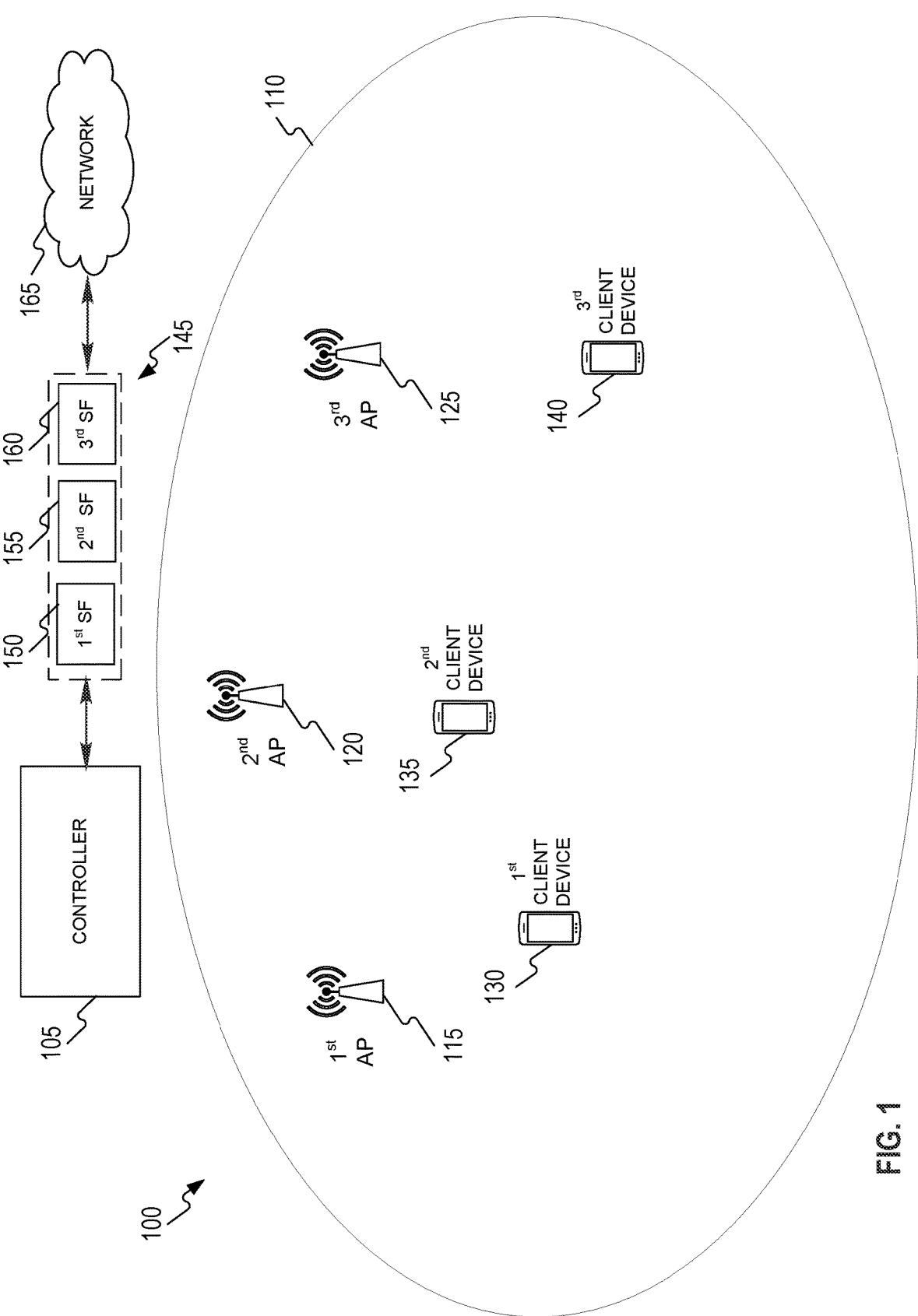
FIG. 1 is a block diagram of an operating environment for providing service chain integration with a Wireless Local Area Network (WLAN)

Service chain integration with a Wireless Local Area Network (WLAN) may be provided. A computing device may send metadata from a wireless network to a Service Function (SF) selected from one of a plurality of SFs. Then the computing device may receive a control trigger from the SF in response to the metadata. The computing device may then perform a service action on the wireless network in response to the control trigger.

Both the foregoing overview and the following example embodiments are examples and explanatory only and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A Wireless Local Area Network Controller (WLC) may be enhanced to provide a layer-2 bridging node to a layer-3 Internet Protocol (IP) routing node. This may provide the opportunity to bring many of the layer-3 features that may not be presently provided. This may also bring an architectural alignment between Wi-Fi and the 3rd Generation Partnership Project (3GPP) 5G System, where the user Plane Function (UPF) is a routing node.

Given the above larger context, there may be an opportunity to bring service chain integration with a Wireless Local Area Network (WLAN) System. The capabilities that are there with the 3GPP system with service chain integration may be brought into WLAN system resulting in a tighter coupling and with feedback loops between service functions deeper in the network and the access network. Metadata elements and triggers exchanged between the Wi-Fi system and the service functions may be used for enabling new capabilities.

For example, a Deep Packet Inspection (DPI) engine in a service chain may perform Central Processing Unit (CPU)-intensive deep packet inspection and identify an application. The identified application along with the associated application Service Level Agreement (SLA), when provided to the WLC (i.e., controller), may enable the WLC to apply the respective Quality-of-Service (QOS) and security policies. Implementing such DPI function on a WLC may cause a performance drop. A trigger from the service chain may be used by the WLC for applying specific QoS policies on that application. In another example, a security function in the service chain upon detecting a compromised wireless Local Area Network (LAN) node or anomaly detection, may provide an indication to the wireless LAN system to terminate or quarantine the session and instruct the enterprise authentication system to block the client from future authentication attempts.

Embodiments of the disclosure may provide dynamic service insertion. Based on the Service Set Identifier (SSID)/Virtual Local Area Network (VLAN)/Application Id, a dynamic traffic steering point may be established. For example, the controller may choose to send the first 10 second duration of traffic to a service function and remove such steering subsequently. This differentiated treatment and dynamic control on the use of service functions may provide service chain integration with wireless systems.

FIG. 1 shows an operating environment 100 providing service chain integration with a Wireless Local Area Network (WLAN). As shown in FIG. 1, operating environment 100 may comprise a controller 105 and a coverage environment 110. Coverage environment 110 may comprise, but is not limited to, a Wireless Local Area Network (WLAN) comprising a plurality of Access Points (APs) that may provide wireless network access (e.g., access to the WLAN for client devices). The plurality of APs may comprise a first AP 115, a second AP 120, a third AP 125. The plurality of APs may provide wireless network access to a plurality of client devices as they move within coverage environment 110. The plurality of client devices may comprise, but are not limited to, a first client device 130, a second client device 135, and a third client device 140. Ones of the plurality of client devices may comprise, but are not limited to, a smart phone, a personal computer, a tablet device, a mobile device, a telephone, a remote control device, a set-top box, a digital video recorder, an Internet-of-Things (IoT) device, a network computer, a router, Virtual Reality (VR)/Augmented Reality (AR) devices, or other similar microcomputer-based device. Each of the plurality of APs may be compatible with specification standards such as, but not limited to, the Institute of Electrical and Electronics Engineers (IEEE) 802.11 specification standard for example.

Controller 105 may comprise a Wireless Local Area Network controller (WLC) and may provision and control coverage environment 110 (e.g., a WLAN). Controller 105 may allow first client device 130, second client device 135, and third client device 140 to join coverage environment 110. In some embodiments of the disclosure, controller 105 may be implemented by a Digital Network Architecture Center (DNAC) controller (i.e., a Software-Defined Network (SDN) controller) that may configure information for coverage environment 110 in order to provide service chain integration with a Wireless Local Area Network (WLAN).

Controller 105 may communicate with a plurality of Service Functions (SFs) 145. Plurality of SFs 145 may comprise a first SF 150, a second SF 155, and a third SF 160. Plurality of SFs 145 may communicate with Network 165 that may comprise, for example, the internet. A service function may satisfy a particular service request. A server may handle different service requests by having a service function for each request. Any of plurality of SFs 145, for example, may comprise: a firewall, Network Address Translation (NAT), Deep Packet Inspection (DPI), Wide Area Network (WAN) acceleration, application acceleration, Server Load Balancing (SLB), Hypertext Transfer Protocol (HTTP) header enrichment, Transmission Control Protocol (TCP) optimizers, Domain Name System (DNS), Dynamic Host Configuration Protocol (DHCP), and Distributed Denial-of-Service (DDOS).

The elements described above of operating environment 100 (e.g., controller 105, first AP 115, second AP 120, third AP 125, first client device 130, second client device 135, third client device 140, or plurality of SFs 145) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of operating environment 100 may be practiced in a computing device 300.

Figure 2:
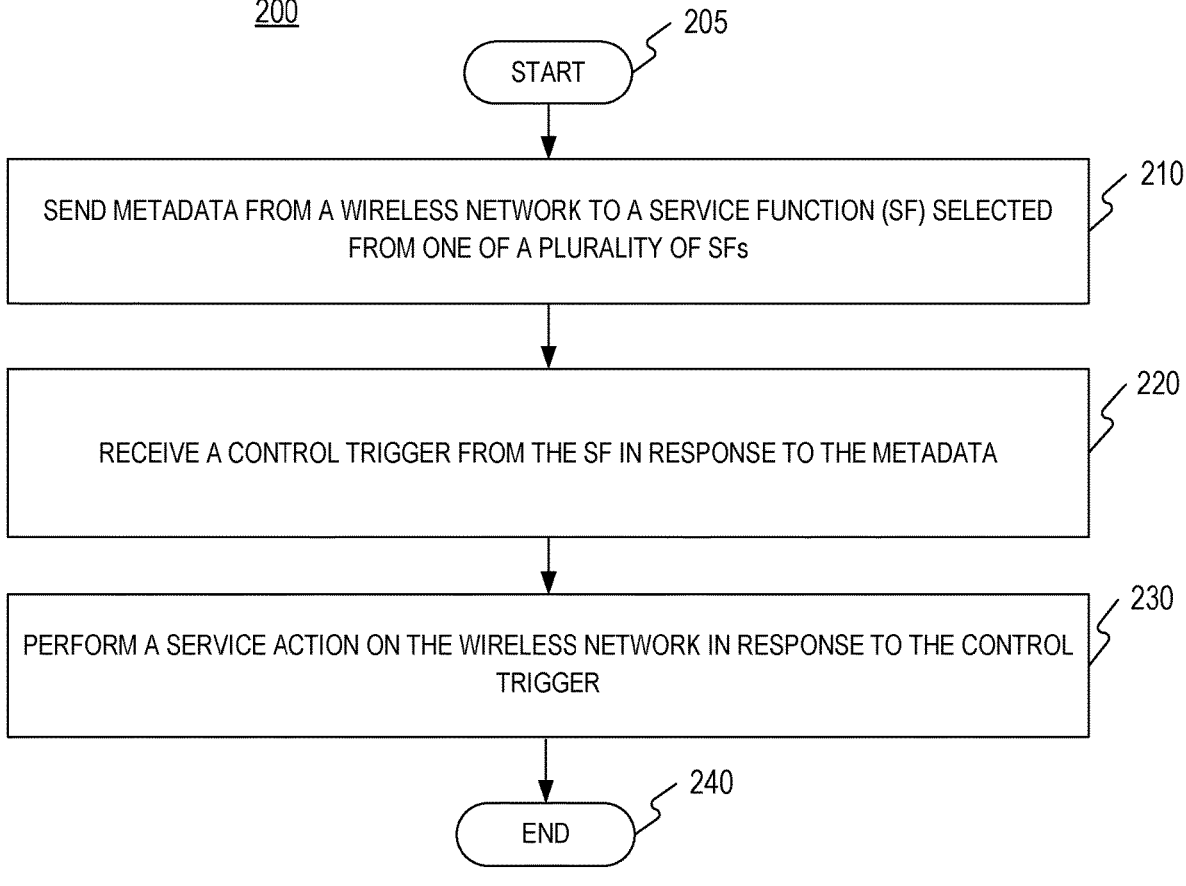
FIG. 2 is a flow chart of a method providing service chain integration with a WLAN.

FIG. 2 is a flow chart setting forth the general stages involved in a method 200 consistent with embodiments of the disclosure for providing service chain integration with a Wireless Local Area Network (WLAN). Method 200 may be implemented using controller 105 and plurality of SFs 145 as described in more detail above with respect to FIG. 1. Ways to implement the stages of method 200 will be described in greater detail below.

Method 200 may begin at starting block 205 and proceed to stage 210 where controller 105 may send metadata (e.g., telemetry plus wireless specific metadata or traffic plus metadata) from a wireless network (e.g., coverage environment 110) to an SF selected from one of plurality of SFs 145. For example, controller 105 may dynamically choose from plurality of SFs 145 a desired SF to use. Example service functions are listed above with respect to FIG. 1. The metadata may comprise, but is not limited to one or more of a client identifier, an access network identifier, an enterprise policy tag, a client device indoor location, an access point identifier, a Service Set Identifier (SSID), and a user role.

From stage 210, where controller 105 sends the metadata from the wireless network (e.g., coverage environment 110) to the SF selected from one of plurality of SFs 145, method 200 may advance to stage 220 where controller 105 may receive a control trigger from the SF in response to the metadata. For example, rather than controller 105 analyzing the metadata, controller 105 may dynamically chose which SF to use and then send the metadata to the selected SF. After analyzing the metadata, the selected SF sends a control trigger back to controller 105. The control trigger may let controller 105 know what action to take.

Once controller 105 receives the control trigger from the SF in response to the metadata in stage 220, method 200 may continue to stage 230 where controller 105 may perform a service action on the wireless network in response to the control trigger. For example, below describes service actions that may be performed. Other service actions may be performed and embodiments of the disclosure are not limited to those listed below.

The service action may comprise termination of a session when a malicious flow is detected by the SF. A security function on detecting a compromised node may send an event to the WLAN system, which may allow the WLC/AP to quarantine the node or dissociate the client device responsible for the malicious flow.

Another service action may comprise reserving specific scheduling resources on an air interface in the wireless network based on a Deep Packet Inspection (DPI) and application identifier as detected by the SF. This may be fed back to the WLC (i.e., controller 105) that may do QoS and resource reservation for the session flow.

Yet another service action may comprises applying a service function insertion on a client session on the wireless network. This may be done on one session or a group of sessions based on SSID, VLAN, AP Identifier, or device classification done by an Authentication, Authorization, and Accounting (AAA) server.

Other embodiments of performing the service action may comprise linking service chain events received over a Network Service Header (NSH) with signaling on the wireless network. The signaling may comprise 802.1x signaling to a client device and Control and Provisioning of Wireless Access Points (CAPWAP) control events with an AP.

Consistent with embodiments of the disclosure, performing the service action may comprise restricting user-access based on at least one of a client device location, user role, and application identifier. Other embodiments may include performing the service action comprising quarantining of a client device for a certain time when an anomaly is detected by an SF and fed back to the controller.

Consistent with another embodiment, performing the service action may comprise permitting access to certain applications based on user role. The user role may be provided by an Identity Services Engine (ISE)/Authentication, Authorization, and Accounting (AAA) server to the WLC and further to service function.

Other embodiments may include performing the service action comprising applying security policies based on a user location. The WLC may feed the client indoor location to service chain functions and further having a feedback mechanism to apply the actions of stricter security policies when a user is in a less secure location. Once controller 105 performs the service action on the wireless network in response to the control trigger in stage 230, method 200 may then end at stage 240.

Figure 3:
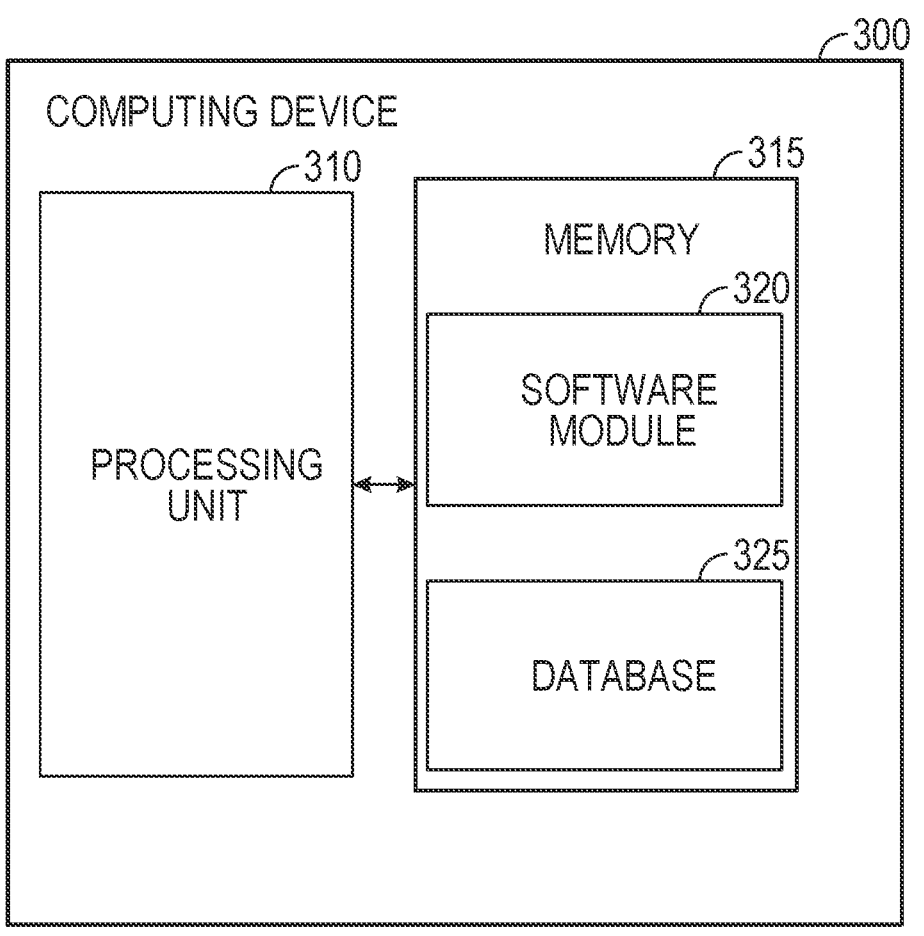
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing service chain integration with a Wireless Local Area Network (WLAN) as described above with respect to FIG. 2 and FIG. 3. Computing device 300, for example, may provide an operating environment for controller 105, first AP 115, second AP 120, third AP 125, first client device 130, second client device 135, or third client device 140. Controller 105, first AP 115, second AP 120, third AP 125, first client device 130, second client device 135, or third client device 140 may operate in other environments and are not limited to computing device 300.

Computing device 300 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples, and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
sending, by a Wireless Local Area Network (LAN) Controller (WLC), metadata from a wireless network to a Service Function (SF) selected from one of a plurality of SFs of a service chain, wherein sending the metadata comprises:
  steering data packets of a session to the SF for a predetermined interval, and
  adding Network Service Header (NSH) comprising the metadata to the data packets;
receiving, by the WLC, a control trigger from the SF in response to the metadata; and
performing, by the WLC, a service action on the wireless network in response to the control trigger.

2. The method of claim 1, wherein performing the service action comprises termination of the session when a malicious flow is detected by the SF.

3. The method of claim 1, wherein performing the service action comprises reserving specific scheduling resources on an air interface in the wireless network based on a Deep Packet Inspection (DPI) and application identifier as detected by the SF.

4. The method of claim 1, wherein performing the service action comprises applying a service function insertion on a client session on the wireless network.

5. The method of claim 1, wherein performing the service action comprises linking service chain events received over the NSH with signaling on the wireless network.

6. The method of claim 1, wherein performing the service action comprises restricting user-access based on at least one of a client device location, user role, and application identifier.

7. The method of claim 1, wherein performing the service action comprises quarantining of a client device for a certain time when an anomaly is detected.

8. The method of claim 1, wherein performing the service action comprises permitting access to certain applications based on user role.

9. The method of claim 1, wherein performing the service action comprises applying security policies based on a user location.

10. The method of claim 1, wherein the metadata comprises one or more of a client identifier, an access network identifier, an enterprise policy tag, a client device indoor location, an access point identifier, a Service Set Identifier (SSID), and a user role.

11. A system comprising:
a memory storage; and
a processing unit coupled to the memory storage, wherein the processing unit is operative to:
  send metadata from a wireless network to a Service Function (SF) selected from one of a plurality of SFs of a service chain, wherein the processing unit being operative to send the metadata comprises the processing unit being operative to:
  steer data packets of a session to the SF for a predetermined interval, and
  add a Network Service Header (NSH) comprising the metadata to the data packets;
receive a control trigger from the SF in response to the metadata; and
perform a service action on the wireless network in response to the control trigger.

12. The system of claim 11, wherein the processing unit being operative to perform the service action comprises the processing unit being operative to terminate the session when a malicious flow is detected.

13. The system of claim 11, wherein the processing unit being operative to perform the service action comprises the processing unit being operative to reserve specific scheduling resources on an air interface in the wireless network based on Deep Packet Inspection (DPI) and an application identifier.

14. The system of claim 11, wherein the processing unit being operative to perform the service action comprises the processing unit being operative to apply a service function insertion on a client session on the wireless network.

15. The system of claim 11, wherein the processing unit being operative to perform the service action comprises the processing unit being operative to link service chain events received over the NSH with signaling on the wireless network.

16. A non-transitory computer-readable medium that stores a set of instructions which when executed perform a method executed by the set of instructions comprising:
sending, by a Wireless Local Area Network (LAN) Controller (WLC), metadata from a wireless network to a Service Function (SF) selected from one of a plurality of SFs of a service chain, wherein sending the metadata comprises:
  steering data packets of a session to the SF for a predetermined interval, and
  adding a Network Service Header (NSH) comprising the metadata to the data packets;
receiving, by the WLC, a control trigger from the SF in response to the metadata; and
performing, by WLC, a service action on the wireless network in response to the control trigger.

17. The non-transitory computer-readable medium of claim 16, wherein performing the service action comprises restricting user-access based on at least one of a client device location, a user role, and an application identifier.

18. The non-transitory computer-readable medium of claim 16, wherein performing the service action comprises quarantining of a client device for a certain time when an anomaly is detected.

19. The non-transitory computer-readable medium of claim 16, wherein performing the service action comprises permitting access to certain applications based on a user role.

20. The non-transitory computer-readable medium of claim 16, wherein performing the service action comprises applying security policies based on a user location.

* * * * *